June 2, 1931.     I. W. DAY     1,807,971
MEANS FOR ELECTRIC WELDING INCLUDING THE EMPLOYMENT OF AN AIR CURRENT
Filed May 22, 1929
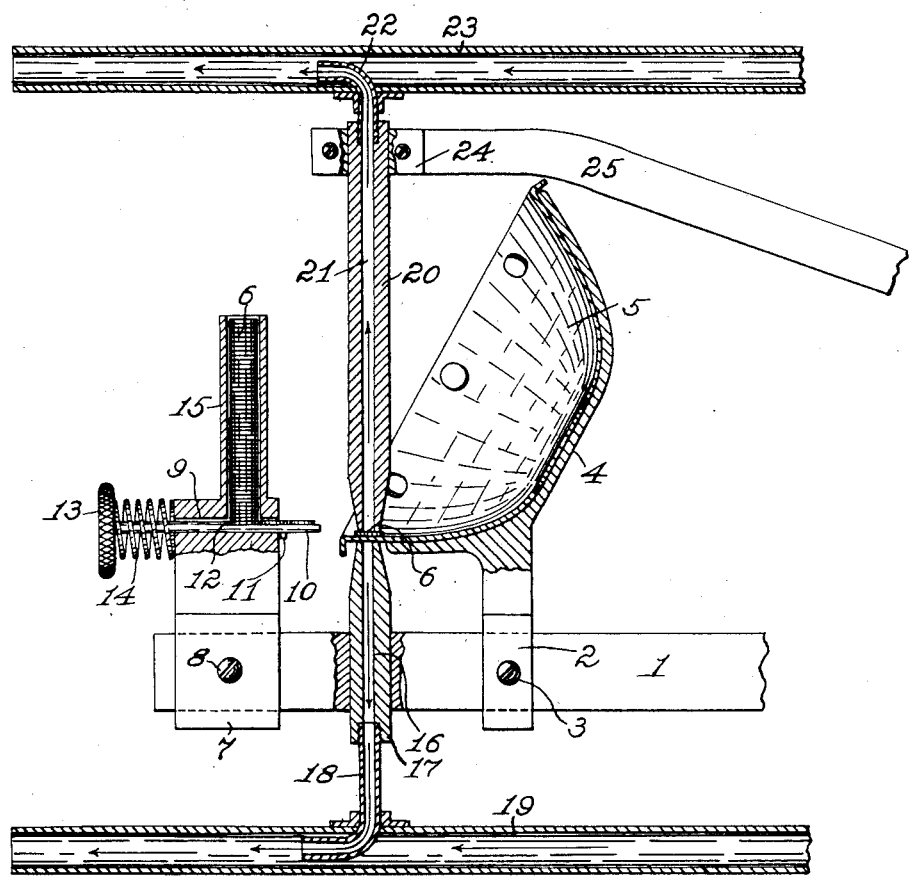
INVENTOR
Ira Walter Day,
BY
ATTORNEY Patented June 2, 1931

1,807,971

UNITED STATES PATENT OFFICE

IRA WALTER DAY, OF WATERLOO, IOWA, ASSIGNOR TO ASSOCIATED MANUFACTURERS CORPORATION OF AMERICA, OF WATERLOO, IOWA, A CORPORATION

MEANS FOR ELECTRIC WELDING INCLUDING THE EMPLOYMENT OF AN AIR CURRENT

Application filed May 22, 1929. Serial No. 365,150.

My invention relates to improvements in means for electric welding including the employment of an air current, and it is my object herein to use for electric spot or other welding operations means for acting upon a welding electrode and through it to first, cause the electrode to pick up and emplace an element upon another element and there weld said elements together, and second, to use said means and particularly an air current means to cool the said electrode, and if desired the coacting electrode, during the intervals of repeated welding operations.

My said object has been successfully effected by the means which are hereinafter described and claimed, and which means are illustrated in the accompanying drawing, which is a view of a diagrammatic or conventional nature of an apparatus for the said purpose, shown in part in side elevation, and in part in medial longitudinal vertical section.

My invention is not restricted to the exact construction and arrangement of parts of said means as herein shown and described, nor to the various details thereof, as the same may be modified or rearranged in various particulars without departing from the spirit and scope of my invention, one practical embodiment of which has been herein illustrated and described without attempting to show all of the various forms, or modifications thereof in which my invention might be embodied.

The invention exemplified in the drawing is particularly appropriated for use in electrically welding small discoidal spacers 6 upon the inner or under wall of the liner frustum 5, one of a number coaxially piled in superposition, spaced apart by said spacers in the bowl of a centrifugal liquid separator. It is to be noted, however, that as stated before, the invention may be varied in its parts and used for uniting other types of electrically weldable elements of different kinds together.

The apparatus includes a relatively fixed horizontal arm 1, upon which is slidably adjusted a depending apertured stem of a concave inclined holder 4 for said frustum 5, the stem secured by a set-screw 3.

Near the outer extremity of the fixed arm 1 the depending stem 7 of a disk-holder 15 is apertured and slidably adjustably secured by a set-screw 8. The upper part of said stem is provided with a horizontal longitudinal apertured seat 9 to receive a slidable push-rod 10, having a terminal handle disk 13, and having its upper face cut away horizontally providing a shoulder 12. On the opposite end part of said push-rod and depending underneath is a short lug 11, to serve as a stop against the adjacent vertical wall of said stem or body 7. From the top of said stem 7 projects upwardly and vertically an open top fixed tube 15 whose bore at the bottom communicates with the apertured seat 9. A supply or pile of the disk elements 6 may be deposited in the hollow of the tube 15 to rest at the bottom upon the flattened upper face of the rod 10 above the floor of the apertured seat 9, and this aperture being relatively wide as compared with its height permits the lowermost disk 6 to be carried with said rod to the right-hand of the stem 7 when the use of the handle permits the rod to be pushed to the right, the shoulder 12 propelling said disk along with the rod. A coiled compression spring 14 is mounted on the push-rod between and engaging the handle disk 13 and the adjacent wall of the stem 7, to return the rod.

The numerals 17 and 20 denote a coacting spaced vertically disposed pair of electrically connected electrodes as used for spot-welding different metallic elements together, for instance for welding spacer disks 6 upon the inner under wall of a hollow frustum 5. The lower electrode 17 is rigidly fixed in the apertured arm 1, and the upper electrode 20 has its upper end secured rigidly and removably in a bearing 24 on an extremity of an oppositely swinging arm 25 adapted to carry the electrode to and from the upper tip of the electrode 17 for the welding of elements such as the disk 6 and the frustum 5 superposed and contacting between them, as in the relative positions shown.

The numeral 23 denotes a tube or hose having an open end and to be connected at its other end with apparatus not shown for supplying it with compressed air. A curved-neck pipe connection 22 is secured between and in communication with the upper end of a central bore 21 of the electrode 20, its upper part curved to the left being within the hollow of the hose 23 concentrically.

The lower electrode 17 may or may not be bored at 16 centrally as desired, according to the kind and condition of the elements to be welded. When so bored, the electrode 17 may have a similar crook-neck connection 18 with another hose 19 or conduit for an air current, or the two conduits 23 and 19 may be in communication with the same source of supply.

In the operation of the device shown, after the placing of the frustum 5 within the concave holder 4, the operator may push the rod 10 to the right, the upper electrode 20 at this time being in its uppermost position of swinging to thus afford proper clearance so that the hither end part of the rod 10 with its superposed disk 6 may be pushed to place the disk 6 thereon under and in the path of downward movement of the tip of the electrode 20. On its downward swing the tip of said electrode contacts with said disk 6. As the air under pressure which is traversing the conduit 23 in the direction of the arrows creates a suction in the crook-neck 22, the atmospheric pressure from below on the disk 6 causes it to adhere to the electrode tip, and is lifted on the next upward swing of the electrode. The operator releases the push-rod allowing the spring 14 to react and return the rod to first position, clearing the upper end or tip of the lower electrode 17. On the returning downward swing of the electrode 20 the adherent disk 6 is pressed between the electrodes, the welding current passes through the elements 6 and 5. The welding by spotting is almost instantaneous in this case, because in the instance shown for example the disk 6 is but eight thousandths and the frustum eighteen thousandths inch in thickness. It will be understood that the means shown will be effectual notwithstanding the fact that the elements to be welded are of different thicknesses or of different metals, that is, any different metals which in their constitution can be welded together, or alloys of either. This mechanical means as before stated is applicable in many different ways too numerous to mention for the handling of the elements to be welded which includes the use of an air current in the manipulation or placing and setting the element such as 6 to be carried to and mounted upon the other such as the lower element 5.

An important feature of my invention is that of including in said apparatus for welding and the means therefor, means for cooling one or both of the electrodes, which in rapid or continuous employment becomes considerably heated. This feature is the boring centrally of one or both of the electrodes, as at 21 and 16, the bores being similarly in communication with an air current as above described, whereby the current is drawn through the bores causing the cooling of the bodies and especially the welding tips of the electrodes.

A conjoint cooling function is thus given the upper or swinging electrode 20, where the suction of the air current shown in the bore 21 by the arrows is the cause of the retention of the upper element 6 in adherence to the electrode tip because of atmospheric pressure upon the under face of said element. When the element is welded to the other element 5, this adherence is broken on the next upward swing of the electrode, and air is sucked through the bore 21 by the injector action of the connection 22 as positioned in the upper hose member 23. The like action occurs with the bored lower electrode when the element 5 is removed and in the short interval between welding operations.

Having described my invention, what I claim as new, and desire to secure by Letters Patent, is:

1. In a device of the character described, a pair of welding electrodes one movable to and from the other, the movable electrode being hollowed, means for drawing a current of air into and discharging from the hollow of said electrode to create a suction at the welding end of said electrode at the entrance of the hollow, and a movable device for delivering an element to be welded in the path of movement of said welding end to be held to it by said suction.

2. In a device of the character described, a pair of welding electrodes, means for cooling them, including a conduit in one electrode for carrying an induced air current from the welding tip through the electrode, a reciprocable device for delivering elements to be welded into the path of movement of said last-mentioned electrode, whereby said element is attracted to and held removably upon the welding tip of the electrode by atmospheric pressure, and a device for releasably holding another element to be welded in contact with the other electrode and positioned to receive the first-mentioned element thereon during the welding operation.

In testimony whereof I affix my signature.

IRA WALTER DAY.